United States Patent
Poupinet et al.

(10) Patent No.: US 7,181,753 B2
(45) Date of Patent: Feb. 20, 2007

(54) IRREVERSIBLE OPTICAL RECORDING MEDIUM

(75) Inventors: Ludovic Poupinet, Seyssinet (FR); Bernard Bechevet, Claix (FR); Marie-Francoise Armand, Vaulnaveys-le-Haut (FR); Robin Perrier, Grenoble (FR); Olivier Fallou, Montrouge (FR)

(73) Assignees: Commissariat a l'Energie Atomique, Paris (FR); MPO International, Averton (FR)

( * ) Notice: Subject to any disclaimer, the term of this patent is extended or adjusted under 35 U.S.C. 154(b) by 566 days.

(21) Appl. No.: 10/258,611

(22) PCT Filed: May 29, 2001

(86) PCT No.: PCT/FR01/01660

§ 371 (c)(1),
(2), (4) Date: Nov. 5, 2002

(87) PCT Pub. No.: WO01/93256

PCT Pub. Date: Dec. 6, 2001

(65) Prior Publication Data

US 2003/0090991 A1 May 15, 2003

(30) Foreign Application Priority Data

May 30, 2000 (FR) .................................. 00 06911

(51) Int. Cl.
*G11B 13/04* (2006.01)

(52) U.S. Cl. ............................................ 720/718
(58) Field of Classification Search ............... None
See application file for complete search history.

(56) References Cited

U.S. PATENT DOCUMENTS

| 5,479,382 A | 12/1995 | Nishida et al. |
| 5,709,978 A | 1/1998 | Hirotsune et al. |
| 5,753,413 A | 5/1998 | Anzai et al. |
| 5,965,229 A * | 10/1999 | Zhou et al. ............. 428/64.4 |
| 6,195,326 B1 * | 2/2001 | Yoshinari et al. ....... 369/275.4 |

FOREIGN PATENT DOCUMENTS

| EP | 0 605 891 | 7/1994 |
| EP | 0 747 895 | 12/1996 |
| EP | 0 822 543 | 2/1998 |
| GB | 2 052 080 | 1/1981 |

OTHER PUBLICATIONS

G. Bouwhuis et al.: Chapter 6: "Materials for on-line optical recording" Principles of Optical Disc Systems, published by Adam Hilder Ltd. pp. 210-227, date not found.

(Continued)

*Primary Examiner*—Hoa Thi Nguyen
*Assistant Examiner*—Mark Blouin
(74) *Attorney, Agent, or Firm*—Oblon, Spivak, McClelland, Maier & Neustadt, P.C.

(57) ABSTRACT

The medium comprises a bilayer stack constituted of an inorganic layer (30) and a semi-reflecting layer (32). The inorganic layer (30) can be deformed under the effect of light radiation (34) passed through the semi-reflecting layer, which lowers the reflection coefficient of the stack.

Application to irreversible recording of information data, for example on discs.

35 Claims, 4 Drawing Sheets

OTHER PUBLICATIONS

M. Chen et al.: "Ablative hold formation process in thin tellurium and tellurium-alloy films" Appl. Phys. Lett., vol. 41, No. 9, pp. 894-895, Nov. 1, 1982.

Wen-yaung Lee: "Thin films for optical data storage" J. Vac. Sci. Technol., vol. A3, No. 3, pp. 640-646 1985.

Y.-S. Tyan et al.: "Laser recording in tellurium suboxide thin films" J. Appl. Phys., vol. 59, No. 3, pp. 716-719 Feb. 1, 1986.

H.G. Craighead et al.: "Textured germanium optical storage medium" Appl. Phys. Lett., vol. 40, No. 8, pp. 662-664 Apr. 15, 1982.

* cited by examiner

IRREVERSIBLE OPTICAL RECORDING MEDIUM

TECHNICAL FIELD

The present invention relates to irreversible optical recording media, for the writing and reading of information data respectively. The recording is irreversible in the meaning that the writing only takes place once, without any possibility of either effacing or rewriting. On the other hand, reading can be repeated.

The invention can be applied, for example, to optical disc recording of the CD-R (Compact Disc Recordable), WORM (Write-Once Read Many), DRAW (Direct Read After Write) or DVD-R (Digital Versatile Disc Recordable) type.

But the invention is not limited to the case of discs. It covers any medium, of any form whatsoever (tape, card etc.).

STATE OF PRIOR ART

In the field of irreversible optical recording, the CD-R, compatible with CD (Compact Disc) quickly imposed itself as a world standard. The evolution of world-wide production is clear evidence of this phenomenon: 862 million discs in 1998, 2078 million in 1999. The present price of a CD-R is less than $1 and a reduction of 30% is expected in the two years to come. The CD-R is thus no longer used only for personal recording but also for producing small series of discs, instead of pressing CDs or CD-ROMs. The length of economic life of the product is difficult to estimate. The most optimistic think that the CD-R may not suffer from competition with the CD-RW (Compact Disc Readable Writable) and the DVD family. In particular, in the computing field, the CD-R could replace the diskette definitively, having a capacity 400 times greater.

At present, the great majority of discs use a technique with a base of organic colouring. The structure of the disc is shown in FIG. 1.

The recording medium shown comprises:
- a transparent substrate 10 (in polycarbonate for example),
- a layer 12 of colouring sensitive to wavelengths comprised between 7750 and 7950 Å,
- a reflecting layer 14, in gold or silver alloy for example,
- one or two protective layers 16.

The data are written on the disc by focussing an optical beam 18 emitted by a high power laser. The beam reaches the layer 12 of colorant through the substrate 10. The light absorbed by the colorant heats the latter and produces an irreversible modification of the optical structure. This modification may be limited to the colorant, but it may also reach the surrounding materials: substrate 10 or reflecting layer 14.

The data are recorded under the form of alternation of non-written zones with high reflection and written zones with low reflection. The data coding is obtained by variation of the length of the marks inscribed.

Data reading is obtained with a light beam reader from a low power laser diode.

The data are written in a spiral on the disc surface. This follow-up of this spiral is made possible, both for reading and for writing, through the presence of a pre-engraved groove in the substrate. The data are only written in the groove. The virgin zone of the spiral is called the land.

This technology has a certain number of problems linked with the ageing of the organic products (by light or temperature for example), with the high sensitivity to wavelength of the colorant (compatibility problem between CD and DVD type formats for example), and with the cost of the stage of depositing the colorant (length of time, maintenance, cost of the raw material).

The latter problem, especially, increases the interest of another solution enabling reduction of production costs. In particular, in countries where the cost of work-hours is high, it is difficult to follow market trends. Thus, in 1998, 37% of world production came from Taiwan compared to 60% in 1999. An interesting solution would be to replace the organic product by an inorganic product. But then other problems arise:
- passage from high reflection, for the virgin disc, to low reflection for the written points must be preserved to allow compatibility with existing material (engravers and readers),
- sufficient sensitivity must be preserved so that the writing power remains within the range accessible to present engravers at a given engraving speed,
- adequate writing quality (strong signal-to-noise ratio, low jitter, low asymmetry) must be obtained to guarantee satisfactory writing and reading,
- the service life must be sufficient despite ageing due to temperature, the sun, impacts and scratches.

It is difficult to solve all these problems simultaneously. Furthermore, industrial realities impose the use of tested and rapid deposit technologies. Usually this involves pulverisation and not evaporation, for example, often too slow. In the same way, cost reduction involves minimising the number of pulverisation stations and therefore the number of materials and layers, and even the thickness of the latter.

The use of inorganic materials for irreversible recordings has been under consideration for a long time. Tellurium and its alloys were studied even before the appearance of colorants. Since the latter imposed themselves, new materials appear regularly in this domain. Among these solutions, few are compatible with existing material for engraving and reading. Nonetheless, many varied solutions have been studied [1]:

Hole formation [2]: This concerns the method studied the most in the eighties. It consists of creating a hole in the active layer with the aid of an intense light pulse. The most used materials in this technique are In, Bi, Te and various chalcogenides (excluding the use of organic materials). All these materials have in common a low fusion point and high absorption properties.

Bubble formation [3]: Traditionally, the active layer comprises a metallic layer (gold or platinum alloy) and a layer of organic polymer. The rise in temperature in the metallic layer is transferred to the polymer layer, resulting in decomposition of the latter and gas emission. This gas detaches the metallic layer from the substrate. Bursting of the bubble can be avoided by optimising the parameters of the active layer. Work on $AgO_x$ can also be included in this category.

Segregation [4]: The constituent of the layer decomposes under laser irradiation. The sub-oxides are suitable candidates, for example $TeO_{1.1}$. This material decomposes into $TeO_2$ and Te after irradiation. Since Te is reflecting, the written point is more highly reflecting than its surroundings.

Crystalline-amorphous phase change: certain materials studied within the framework of ablation are close to phase-change materials. Thus it can be deduced that the materials usually used for recording by change of phase can be used in irreversible manner within the framework of ablation. However, to ensure that data writing by phase change represents a modification of reflection from a high to a low value, the material must change from the crystalline state to the amorphous state. But the material is in an amorphous state after being deposited on the substrate. Writing by phase change therefore requires an initialisation stage consisting of crystallising the material over the whole surface of the disc. This stage involves a non-negligible cost factor in the manufacture of a disc of this type. Finally, control of the thermal effects in the disc often needs the presence of three to four layers, certain of them, dielectric, being relatively thick. The use of irreversible writing based on phase change therefore seemed to be without interest from the economic point of view.

Texture change [5]: This technique, in general, concerns active layers with germanium or silicon base. The rough surface of the layer becomes smooth after laser irradiation. Reflection therefore changes from a low value to a high value. This is not the change direction required. Furthermore, these discs often have a high noise level.

As far as the Applicants know, a disc with reflection greater than 60% with a single layer of inorganic material can only be obtained with thick layers and/or materials close to the noble metals. But writing in these materials can only be carried out at high powers incompatible with standards, in particular because of lower absorption, higher thermal conductivity and a higher fusion temperature. For example, it is impossible to write a so-called "3T-3T" signal (where 3T indicates the length of the marks written on the disc and the length of the intervals between the marks), with a good signal-to-noise ratio (this ratio remaining lower than 20 dB whatever the power) in a layer of gold of 20 nm with a reflection of 60%. The same trial with a layer of 10 nm, with a reflection of around 40%, produces an identical result. Generally, to raise sensitivity, materials more sensitive than noble metals are used, for example tellurium. Unfortunately, a single layer of sensitive material generally does not make it possible to obtain sufficient initial reflection. This is also the case with a material such as tellurium used by the Applicants as shown in FIG. 2. This figure shows, as abscissa, the reflection R in % in a writing zone and as ordinate, the minimum writing power P (in mW). The obtained reflection for the material under study never exceeds 50%, whatsoever the thicknesses and deposit conditions.

A traditional method for increasing the reflection consists of adding a layer of gold or silver behind the sensitive layer [6] (relative to the incidence of the light, similar to the case of discs with a base of organic material). This reflecting layer is generally separated from the sensitive layer by a dielectric layer. For certain writing mechanisms, such as hole formation for example, the presence of this dielectric layer often results in a loss of sensitivity and a drop in the signal-to-noise ratio. Therefore, it is necessary to reduce the thickness of the sensitive layer in order to lower the threshold power. Unfortunately, in general, very thin layers have a poor signal-to-noise ratio and a lower reflection.

The aim of the present invention is to overcome all these disadvantages.

DESCRIPTION OF THE INVENTION

The invention therefore recommends using a very simple structure, without organic material, with operation compatible with known techniques and materials. Essentially, this structure comprises a bilayer stack constituted of a semi-reflecting layer and an inorganic layer. The writing is obtained through the semi-reflecting layer. The reading takes place by the same face. Under the effect of irradiation, the inorganic layer suffers deformations of diverse natures: hollows, cracks, bubbles, cavities, craters, bulges, splits, swellings, curling, partial or total ablation, reflux of material etc. There may also be deformations in the semi-reflecting layer and in the substrate. The power levels required for deformations to appear are compatibles with those operating in present engraving equipment. In any case, they have the effect of lowering the reflection coefficient of the bilayer stack which, outside the zones deformed in this way, can reach 65%. The inorganic layer at the origin of these deformations is hereinafter called the "active layer". In itself, when it is not deformed, it has a certain reflection coefficient which is insufficient. The semi-reflecting layer acts together with the inorganic layer to raise the value of this reflection.

More precisely, the aim of the present invention is a recording medium for writing information data, characterised in that it comprises a bilayer stack constituted by a semi-reflecting layer and an inorganic active layer, the inorganic active layer being suitable for undergoing deformations under the effect of an optical radiation for writing directed through the semi-reflecting layer, these deformations lowering the reflection coefficient of the stack.

A further aim of the invention is a recording medium for reading information data, characterised in that it comprises a bilayer stack constituted by a semi-reflecting layer and an inorganic active layer, the inorganic active layer having deformations in certain zones, the reflection coefficient of the stack being lower inside these zones than outside them.

Preferably, the bilayer stack is deposited on a substrate. The semi-reflecting layer can be set between the substrate and the inorganic active layer. Conversely, the organic active layer can be set between the substrate and the semi-reflecting layer. In the former case, the substrate must be transparent. This substrate can be engraved in the form of a spiral groove.

More preferably, the semi-reflecting layer is a metal. This metal can be selected from the group comprising aluminium, silver, copper, gold, zinc, titanium and their alloys. Aluminium seems to be a particularly appropriate metal.

The semi-reflecting layer can be produced in two (or more) different materials. For example, it may comprise a thin layer of gold and a thin layer of silver.

Preferably, the active layer is made in a material selected from the group comprising tellurium, antimony, selenium, indium, bismuth, arsenic and their alloys.

The active layer can be an SbTe or SbSe alloy with a metal selected from the group comprising Al, Ag, Cu, Si, As.

Furthermore, the material of the active layer can comprise a certain proportion of nitrogen.

According to an advantageous embodiment, a protective layer is deposited on the stack, on the inorganic active layer side. This protective layer can be made of elastomer-silicon. A dielectric intermediary layer, organic or inorganic, may possibly be inserted between the active layer and the protective layer. This intermediary layer helps writing and/or the service life of the medium due to its thermal, chemical and/or mechanical properties.

Another aim of the present invention is a writing method for a recording medium such as defined hereabove and wherein the optical beam is directed onto the active layer through the semi-reflecting layer, the power of the optical beam being able to provoke deformations of the active layer.

Yet another aim of the present invention is a reading method for a recording medium such as defined above, wherein an optical beam is directed onto the active layer through the semi-reflecting layer, the power of the optical beam being able to produce a reflected beam with intensity depending on the deformations of the active layer.

DESCRIPTION OF PREFERRED EMBODIMENTS

Figure 1:
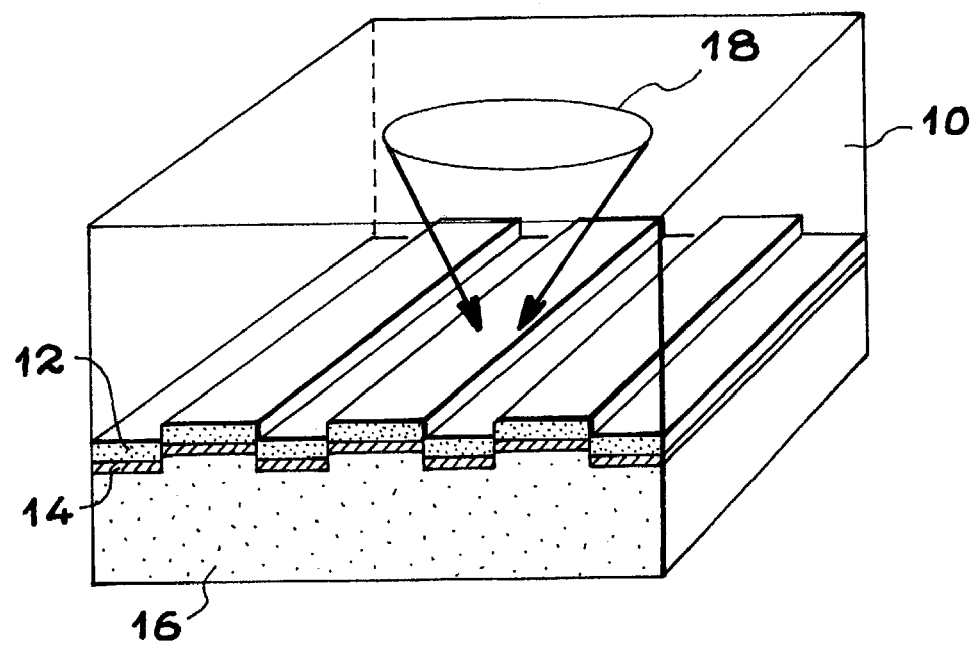
FIG. 1, already described above, shows a diagram of the principle of a disc with organic colouring.
Figure 2:
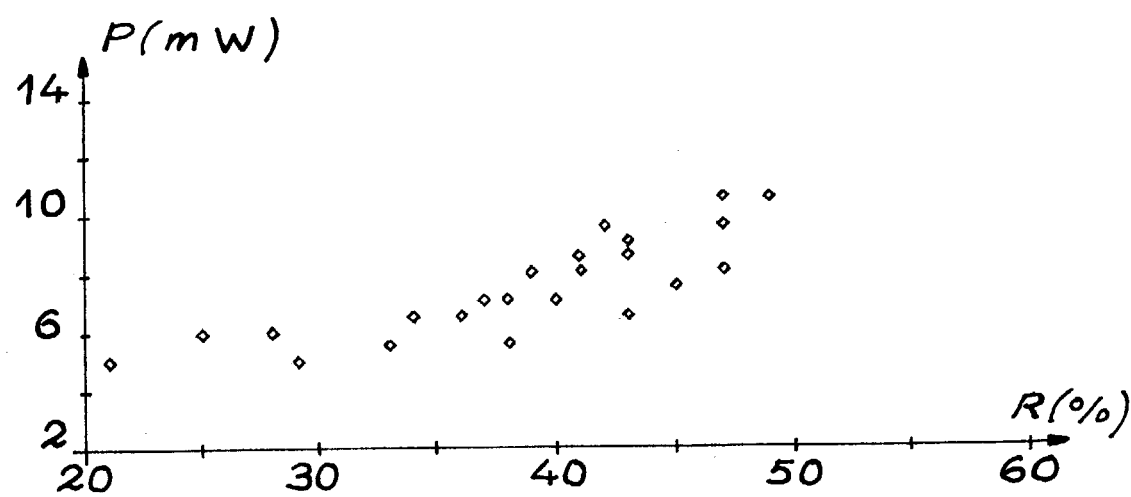
FIG. 2 shows the link between the reflection coefficient of a single inorganic layer made of $Sb_2Te_3$ and the luminous power required for writing.
Figure 3A:
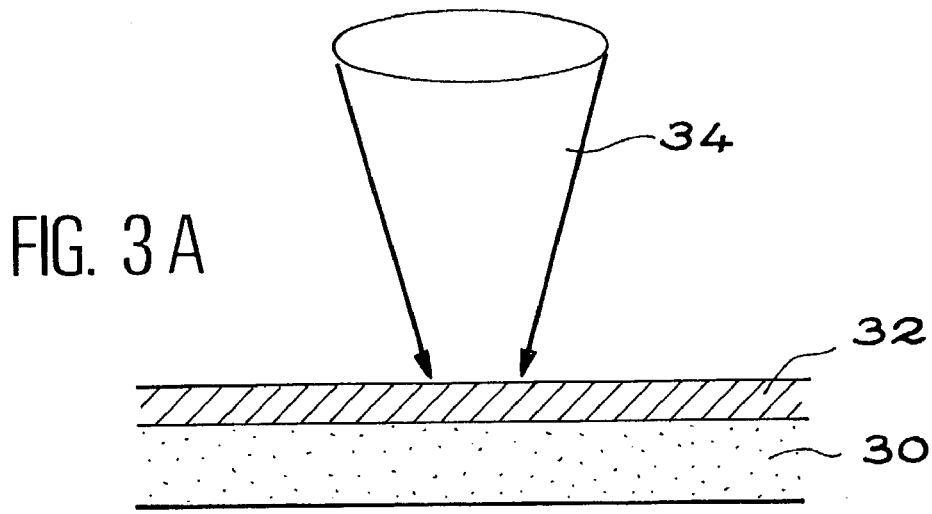
FIGS. 3A and 3B show diagrammatically the bilayer stack according to the invention, before and after writing.

FIG. 3A shows a bilayer stack according to the invention. This stack is constituted of an inorganic layer 30, hereinafter called "active layer", and a semi-reflecting layer 32, metallic for example. This stack can be written by a light beam 34 directed onto and through the semi-reflecting layer 32. The energy deposited by the light beam, after crossing the semi-reflecting layer, deforms the active layer as explained above. The semi-reflecting layer 32 may or may not be deformed as well.

Figure 3B:
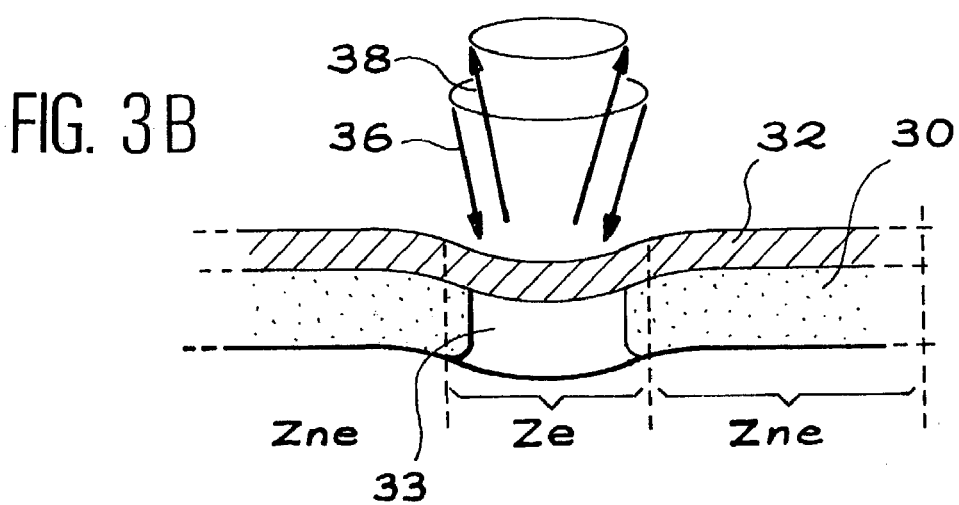

FIG. 3B shows the stack after writing and during the reading operation. The reading beam 36, of lower intensity than the writing beam 34, is directed towards the semi-reflecting layer 32. Due to the deformation of the active layer 30 (which in the case shown is linked to the appearance of a hole 33) and possibly of the semi-reflecting layer 32, the reflection coefficient of the stack is lower in the written zones Ze than in the non-written zones Zne. The reflected beam 38 is therefore less intense in the written zones Ze than in the non-written zones Zne which makes it possible, by optical means known to those skilled in the art, to differentiate between the different zones and thus to read the recorded data.

Figure 4:
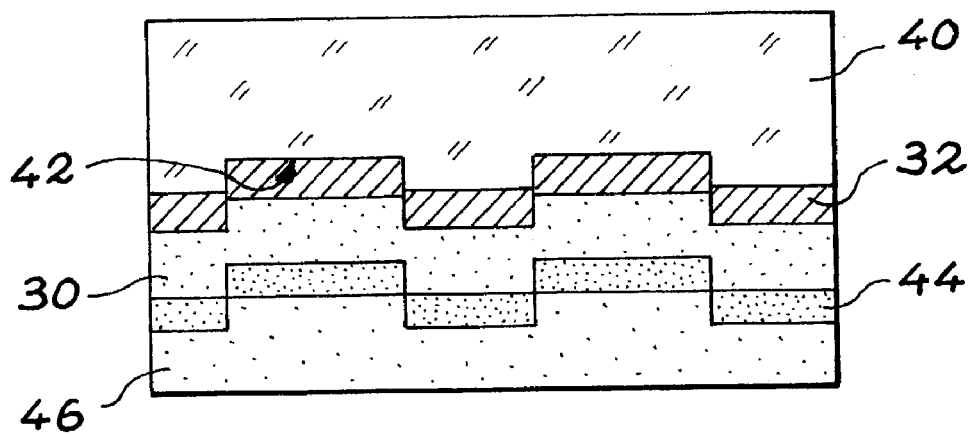
FIG. 4 shows a special embodiment of production of a medium according to the invention in the case of a disc comprising grooves engraved in a substrate with protective layer.

The bilayer stack described above can be deposited on any substrate whatsoever and in particular on a substrate in disc form with en engraved groove. This is shown in FIG. 4 with a certain number of options. In this figure, one can see a transparent substrate 40 engraved with grooves 42 and a bilayer stack 30–32 according to the invention.

Furthermore, in the embodiment shown, the medium comprises a dielectric layer 44 and a protective layer 46.

The substrate 40 can be made in plastic (polycarbonate or PMMA, for example) with grooves of width of from 400 to 800 nm and depth of from 20 to 60 nm.

In FIG. 4, the semi-reflecting layer 32 is deposited on the substrate, which means that the latter is assumed to be transparent, because both the writing and reading take place through this layer. But the arrangement can also be reversed and the active layer can be set on the substrate, in which case it is the protective layer 46 which must be transparent. In this case, the substrate can be opaque.

The material of the semi-reflecting layer is chosen for its reflecting properties (Al, Zn, Au, Ag, Cu or their alloys for example). It is preferable for this layer to absorb little light. The semi-reflecting layer being seen first by the light beam, its thickness must be adjusted as accurately as possible to increase the reflection without raising the writing threshold excessively. This thickness can, for example, be of from 4 to 10 nm.

The active layer is at the base of the writing mechanism but also participates in the reflection of the stack. Its thickness is of from 10 to 100 nm and must be adjusted to be able to conserve reasonable writing power with adequate reflection. The conditions for depositing this layer are adjusted in order to work with optimum thickness with constant reflection. In fact, the holes, bubbles, cavities etc. formed must be sufficiently big for the contrast to be good but not too big in order to limit the reading noise. However, the size of the holes, bubbles, cavities etc. seems to be proportional, in certain cases, to the thickness of the layer. The material of this layer can, for example, be: Te, $Sb_2Te_3$, In, Bi, $Bi_2Te_3$, SeTe, Se, $As_3Se_3$, $As_2Te_3$.

Figure 5:
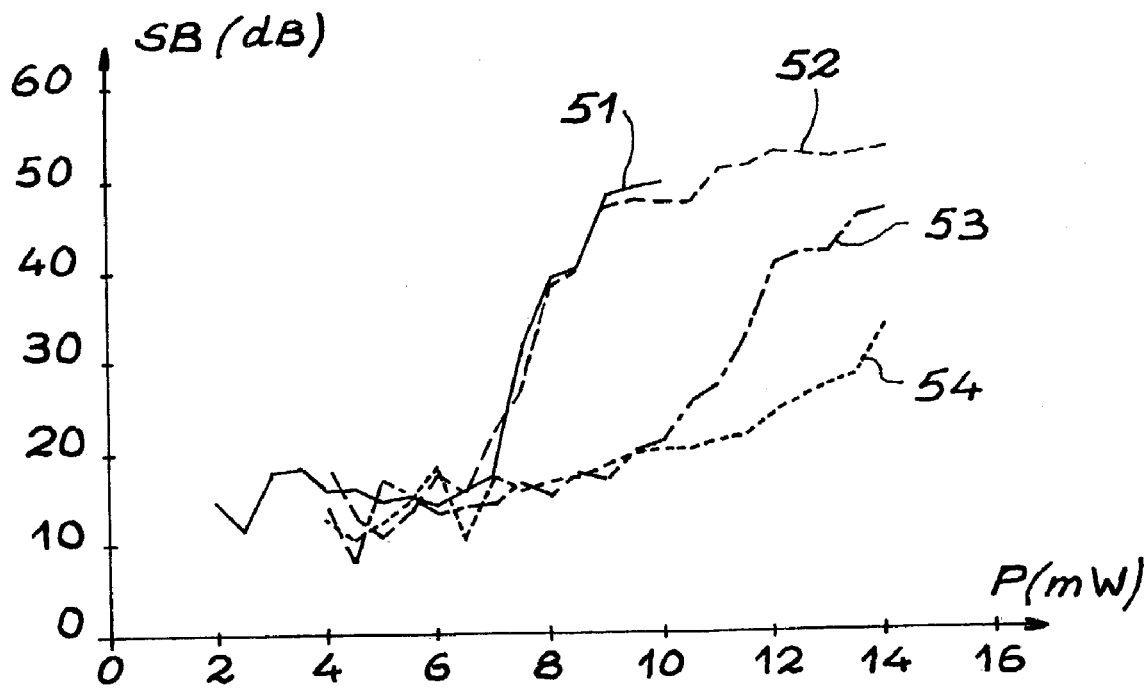
FIG. 5 assembles the curves showing the development of the signal-to-noise ratio in function of the writing power for several thicknesses of the semi-reflecting layer.

The measurement results are shown in FIG. 5. This figure shows the variations of the signal-to-noise ratio (S/B) as ordinate and expressed in dB, in function of the optical power P as abscissa and expressed in mW. The curves correspond to a succession of written zones of width 3T and non-written zones of the same width, for a linear rotation speed of the disc equal to four times a reference speed of 1.2 m/sec, that is 4.8 m/sec. The active layer had a thickness of 25 nm. The semi-reflecting layer was a layer of aluminium of variable thickness, of 6 nm, 7 nm, 8 nm and 9 nm respectively for the curves 51, 52, 53, 54. The reflection coefficient of the stack in the non-written zones was 46, 48, 50 and 51% respectively (whereas, without a reflecting layer, it would only have been 40%)

The bilayer stack according to the invention suffices to write and read information data. Nonetheless, as an option, it is possible to add other layers to this stack to protect the disc from physico-chemical modifications of the materials (oxidation for example), to avoid damage by scratches or impacts and to avoid soiling or various traces whose presence could hinder the reading or writing and whose cleaning could risk damaging the disc. Therefore one or two layers can be added, or even more, knowing that the greater the number of layers added the less interesting the solution becomes economically. In general, the last layer deposited ensures mechanical protection. It is often a varnish deposited using a turntable, solidified under ultraviolet radiation, and with a thickness of a few microns. The sealed disc technique can also be used.

For various reasons, the intermediary dielectric layer 44 can be added between the active layer 30 and the protective layer 46, as shown in FIG. 5, in particular to encourage deformation of the active layer mechanically and thermally and to strengthen its resistance. This intermediary layer can also insulate the active layer chemically from the protective layer.

Preferably, the active and reflecting layers are deposited by pulverisation. The conditions for depositing the two layers are chosen so as to obtain sufficient reflection while still conserving a writing power threshold compatible with most engraving equipment available on the market. The intermediary and protective layers can be produced by pulverisation or by turntable deposit, depending on the nature of the materials and the thickness of the layers.

A few example of embodiments will now be described. It is evidently understood that these do not limit the scope of the invention in any way whatsoever.

EXAMPLE 1

The substrate is in polycarbonate. The reflecting layer is in aluminium with a thickness of from 6 to 9 nm. It is deposited by pulverisation with a target current of 500 mA and an argon pressure of $3.10^{-3}$ mbar. The active layer is constituted of $Sb_2Te_3$, of thickness 25 nm (calculated from deposit time). It is deposited by pulverisation with an argon pressure of $10^{-3}$ mbar and a target current of 100 mA. The focussed beam reflections measured using a CD-R tester available on the market are as follows:

|  | Sample number | | | | |
| --- | --- | --- | --- | --- | --- |
|  | 1 | 2 | 3 | 4 | 5 |
| Aluminium thickness (nm) | 0 | 6 | 7 | 8 | 9 |
| Reflection (arbitrary unit) | 1 | 1.15 | 1.2 | 1.25 | 1.28 |

Figure 6:
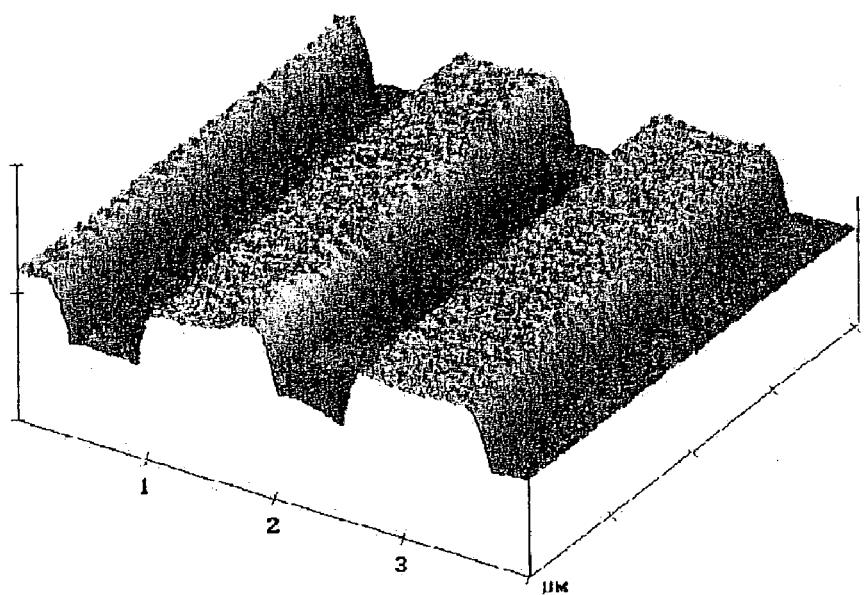
FIGS. 6A and 6B show the image of a medium after illumination with a laser of low and high power respectively.
Figure 6:
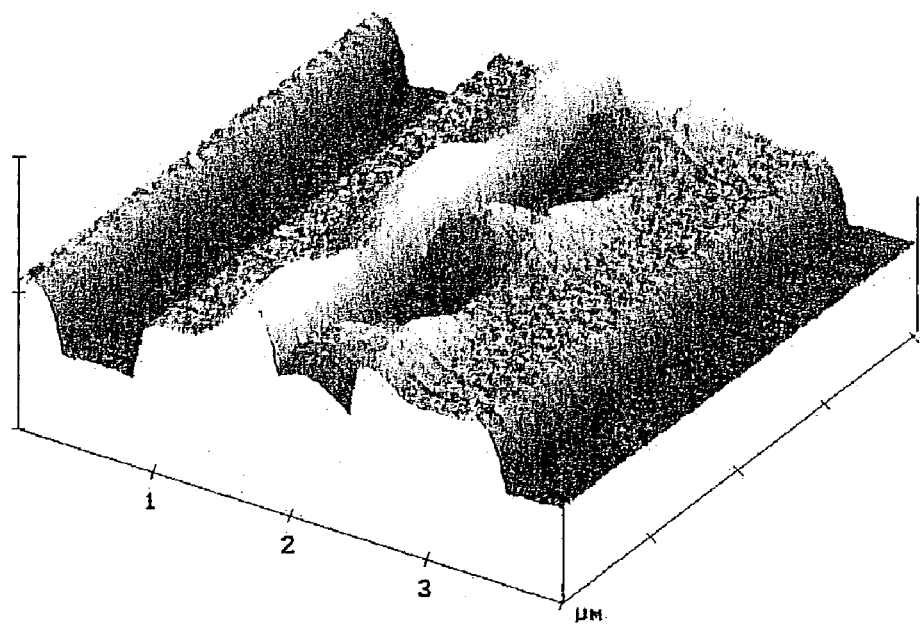

Variations in the signal-to-noise ratio in function of the writing power obtained at speed 4.8 m/sec for samples comprising an aluminium layer are shown in FIG. 6. For a speed of 1.2 m/sec the signal-to-noise ratio is higher than 45 dB for a power greater than 5.5 mW for samples 2 and 3, and greater than 7 mW for sample 4. The signal-to-noise ratio is higher than 43 dB from 8 mW for sample 5. At double speed (2.4 m/sec) the signal-to-noise ratio is greater than 47 dB from 7.5 mW for samples 2 and 3, and from 10 mW for sample 4.

EXAMPLE 2

The substrate is in polycarbonate. The reflecting layer is in aluminium with a thickness of from 6 to 9 nm. It is deposited by pulverisation with a target current of 500 mA and an argon pressure of $3.10^{-3}$ mbar. The active layer is constituted of $Sb_2Te_3$, of thickness 30 nm (calculated from deposit time). It is deposited by pulverisation with an argon pressure of $10^{-3}$ mbar and a target current of 250 mA. The focussed beam reflections measured using a CD-R tester available on the market are as follows:

|  | Sample number | | | | |
| --- | --- | --- | --- | --- | --- |
|  | 1 | 2 | 3 | 4 | 5 |
| Aluminium thickness (nm) | 0 | 6 | 7 | 8 | 9 |
| Reflection (arbitrary unit) | 1 | 1.12 | 1.19 | 1.23 | 1.30 |

Sample 2 has a signal-to-noise ratio greater than 42 dB starting from 4 mW at speed 1.2 m/sec, 46 dB starting from 6 mW at speed 2.4 m/sec and 48 dB starting from 10 mW at speed 4.8 m/sec. Sample 3 has a signal-to-noise ratio greater than 45 dB starting from 6.5 mW at speed 1.2 m/sec, 8.5 mW at double speed and 12 mW at quadruple speed. All these tests were carried out with a signal composed of alternation of zones of the same length.

EXAMPLE 3

The substrate is in polycarbonate. The layer is in aluminium of 7 nm thickness, the active layer is of thickness 40 nm and is constituted of $Sb_2Te_3$. A protective layer of 40 nm in silica is provided. The reflection of the disc in non-written zone is 60%. This stack was irradiated by a light beam of wavelength comprised between 7700 Å and 7900 Å and the results of the irradiation were observed by AFM (Atomic Force Microscope). The disc surface (silicon-layer side), for low power and for high power, is shown in FIGS. 6A and 6B.

EXAMPLE 4

Figure 7:
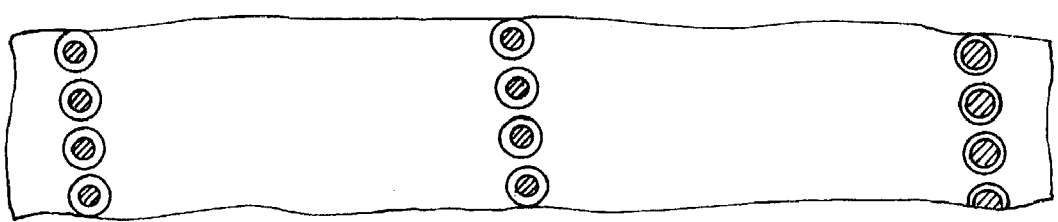
FIG. 7 represents an image of points inscribed on a varnished disc.

The substrate is in polycarbonate. The active layer of 20 nm is composed of $Sb_2Te_3$. It is produced by pulverisation. The semi-transparent layer is in aluminium-chrome alloy of 7 nm thickness. A protective varnish was deposited by turntable and solidified with a UV lamp. FIG. 7 shows the points inscribed on the disc.

EXAMPLE 5

The substrate is in polycarbonate. The active layer of 28 nm is composed of $Sb_2Te_3$. It is produced by pulverisation. The semi-transparent layer is in aluminium of 6 nm thickness. The signal-to-noise ratio was measured before application of a protective layer. The threshold powers are compatible with the CD-R standard: 4 mW at speed 2.4 m/sec, 5 mW at 4.8 m/sec, 8 mW at 9.6 m/sec.

With an elastomer layer, the threshold powers remain compatible with the CD-R standard: 4 mW at speed 2.4 m/sec, 5 mW at 4.8 m/sec, and 9 mW at 9.6 m/sec.

At the speed 145.4 m/sec the threshold power is 13 mW for a signal-to-noise ratio of 47 dB, with the elastomer layer.

Concerning the wavelength of the light used to write and read the data, certain information can be provided. For the CD family (CD-R) one works at around 8000 Å (close to the infra-red), the ranges being determined in the standards. They differ for reading and writing. For the DVD (DVD-R for example) one works in the red around 6300 or 6500 Å. Other wavelengths, in the green or in the blue can also be used.

REFERENCES

1. "Principles of optical disc systems", G. Bouwhuis et al., published by Adam Hilger Ltd, chapter 6 "Materials for on-line optical recording" p. 210–227.
2. "Ablative hole formation process in thin tellurium-alloy films", M. Chen et al., appl. Phys. Lett. 41(9), 894–896 (1982).
3. "Thin films for optical data storage", W.-Y. Lee, J. Vac. Sci. Technol. A3(3) 640–646 (1985).
4 "Laser recording in tellurium suboxide thin films", Y-S Tyan et al., J. Appl. Phys. 59(3) p. 716 (1986).
5. Textured germanium optical storage medium", H. G. Craighead, Appl. Phys. Lett. 40(8) p. 662 (1982).
6. EP 0605891 and EP 0747895.

The invention claimed is:
1. Recording medium for writing information data, comprising:
   a bilayer stack comprising
      a semi-reflecting layer, and
      an inorganic active layer,
   the inorganic active layer being suitable for undergoing deformations under the effect of an optical radiation for writing directed through the semi-reflecting layer, these deformations lowering the reflection coefficient of the stack.

2. Recording medium according to claim 1, wherein the bilayer stack is deposited on a transparent substrate, the semi-reflecting layer being set between the substrate and the inorganic active layer.

3. Recording medium according to claim 1, wherein the bilayer stack is deposited on a substrate, the inorganic active layer being set between the substrate and the semi-reflecting layer.

4. Recording medium according to claim 1, wherein the semi-reflecting layer is in metal.

5. Recording medium according to claim 4, wherein the metal of the semi-reflecting layer is selected from the group comprising Al, Ag, Cu, Au, Zn, Ti and their alloys.

6. Recording medium according to claim 4, wherein the semi-reflecting layer comprises two metallic layers.

7. Recording medium according to claim 1, wherein the inorganic active layer is in a material selected from the group comprising Te, Sb or Se, and their alloys.

8. Recording medium according to claim 1, wherein the inorganic active layer is in an SbTe alloy with an element selected from the group comprising Al, Ag, Cu, Si, As.

9. Recording medium according to claim 1, wherein the inorganic active layer is in an SbSe alloy with an element selected from the group comprising Al, Ag, Cu, Si, As.

10. Recording medium according to claim 1, wherein the inorganic active layer is in a SeTe alloy with an element selected from the group comprising Al, Ag, Cu, Si, As.

11. Recording medium according to claim 1, wherein the inorganic material of the active layer comprises a proportion of nitrogen.

12. Recording medium according to claim 1, wherein a protective layer is deposited on the stack.

13. Recording medium according to claim 12, furthermore comprising a dielectric intermediary layer between the stack and the protective layer.

14. Recording medium according to claim 12, wherein the protective layer is in elastomer-silicon.

15. Recording medium according to claim 1, wherein the semi-reflecting layer has a thickness of from 4 to 10 nm.

16. Recording medium according to claim 1, wherein the inorganic active layer has a thickness of from 10 to 100 nm.

17. Method of writing for a recording medium according to claim 1, wherein an optical beam is directed onto the active layer through the semi-reflecting layer, the power of the optical beam being able to provoke deformations of the active layer.

18. Recording medium according to claim 1, wherein said deformations are structural deformations of the inorganic layer.

19. Recording medium according to claim 18, wherein said deformations are selected from the group consisting of hollows, cracks, bubbles, cavities, craters, bulges, splits, swellings, curling, partial ablation, total ablation, reflux of material and combinations thereof.

20. Recording medium for reading information data, comprising:

a bilayer stack comprising
 a semi-reflecting layer, and
 an inorganic active layer,
the inorganic active layer having deformations in certain zones, the reflection coefficient of the stack being lower inside these zones than outside them.

21. Method of reading for a recording medium according to claim 20, wherein the optical beam is directed onto the active layer through the semi-reflecting layer, the power of the optical beam being able to produce a reflected beam with intensity depending on the deformations of the active layer.

22. Recording medium according to claim 20, wherein the bilayer stack is deposited on a transparent substrate, the semi-reflecting layer being set between the substrate and the inorganic active layer.

23. Recording medium according to claim 20, wherein the bilayer stack is deposited on a substrate, the inorganic active layer being set between the substrate and the semi-reflecting layer.

24. Recording medium according to claim 20, wherein the semi-reflecting layer is in metal.

25. Recording medium according to claim 24, wherein the metal of the semi-reflecting layer is selected from the group comprising Al, Ag, Cu, Au, Zn, Ti and their alloys.

26. Recording medium according to claim 24, wherein the semi-reflecting layer comprises two metallic layers.

27. Recording medium according to claim 20, wherein the inorganic active layer is in a material selected from the group comprising Te, Sb or Se, and their alloys.

28. Recording medium according to claim 20, wherein the inorganic active layer is in an SbTe alloy with an element selected from the group comprising Al, Ag, Cu, Si, As.

29. Recording medium according to claim 20, wherein the inorganic active layer is in an SbSe alloy with an element selected from the group comprising Al, Ag, Cu, Si, As.

30. Recording medium according to claim 20, wherein the inorganic active layer is in an SeTe alloy with an element selected from the group comprising Al, Ag, Cu, Si, As.

31. Recording medium according to claim 20, wherein the inorganic material of the active layer comprises a proportion of nitrogen.

32. Recording medium according to claim 20, wherein a protective layer is deposited on the stack.

33. Recording medium according to claim 32, furthermore comprising a dielectric intermediary layer between the stack and the protective layer.

34. Recording medium according to claim 20, wherein said deformations are structural deformations of the inorganic layer.

35. Recording medium according to claim 34, wherein said deformations are selected from the group consisting of hollows, cracks, bubbles, cavities, craters, bulges, splits, swellings, curling, partial ablation, total ablation, reflux of material and combinations thereof.

* * * * *